Dec. 12, 1961 E. C. HUNGATE 3,012,677
APPARATUS FOR FILTERING LINT FROM A LIQUID
Filed Oct. 3, 1957
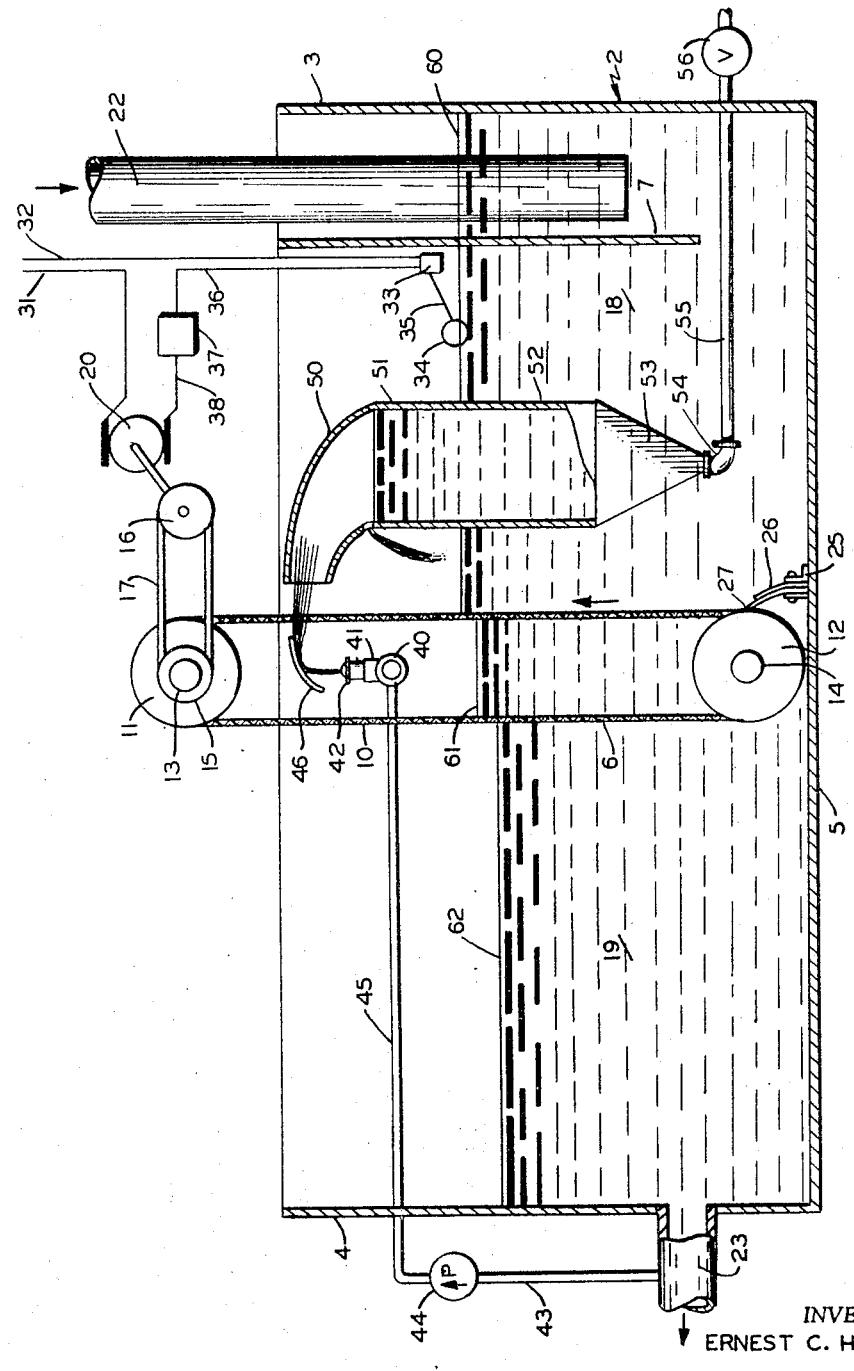
INVENTOR.
ERNEST C. HUNGATE
BY
ATTORNEY

United States Patent Office 3,012,677
Patented Dec. 12, 1961

3,012,677
APPARATUS FOR FILTERING LINT
FROM A LIQUID
Ernest C. Hungate, Liverpool, N.Y., assignor to Carrier Corporation, Syracuse, N.Y., a corporation of Delaware
Filed Oct. 3, 1957, Ser. No. 687,998
1 Claim. (Cl. 210—107)

This invention relates to apparatus for filtering material from a liquid and, more particularly, to apparatus for removing lint from water used to treat air in textile mills.

Heretofore humidity and temperature conditions in textile mills were customarily regulated by a device known as an "air washer," which consisted of means for passing an air stream through the unit, means for passing a water spray into the air stream passing through the unit and means for removing entrained water particles from the air stream passing from the unit. The water spray not only affects the humidity of the air passing therethrough but also performs a heat exchange function. In addition it serves to wash the lint particles from the air stream. Inherent in the operation of these type units is a unit of comparatively large size requiring a separate equipment room.

To collect the spray water within the unit, a sump of approximately 18" in depth is provided, having a filter arrangement provided within the sump. This filter usually consists of a revolving cylinder or belt. Because of the limited head of water within the sump the belt or cylinder has very coarse perforations which cause poor filtering and also provides maintenance problems.

With the introduction of the "Rotaspray" unit as disclosed in my copending application Serial No. 575,560 filed April 2, 1956, and now Patent No. 2,932,360 issued April 12, 1960, a new concept of industrial air conditioning was made available. The above unit, because of its high capacity, small size, self-cleaning and low maintenance features, changes the air treatment device from a large, in-flexible unit requiring separate equipment rooms to a unitary device which can be placed on the roof or hung from the ceiling of a plant.

As an immediate consequence, it has been found that the large water sumps in the units are no longer available. Also, a new filtering system is required, preferably one which will filter the water requirements of a number of large units.

The chief object of the present invention is to provide an improved apparatus for removing lint from water.

Another object is to provide an improved device for cleaning lint from filter elements.

A still further object is to provide a combined lint screen cleaning device and lint collecting device which would facilitate the handling of lint so collected. These and other objects of my invention will become more apparent from the following description.

The present invention relates to a filter system including a vessel having means for passing liquid to be filtered into said vessel. A filter element is located within the vessel so as to be partially submerged by the liquid. Means are provided for cleaning the filter element within the vessel with means responsive to the level of liquid within the vessel for actuating the cleaning of the filter element.

The attached drawing illustrates a preferred embodiment of the invention in which the FIGURE is a partly diagrammatic and partly sectional view of the invention employing a vertically disposed endless belt-type filtering element.

Referring to the drawing, there is shown a tank 2 having sides 3 and 4 and a bottom section 5. Located substantially in the center of the vessel is a filter element 6. This particular filter element comprises an endless belt of a suitable screen material. This screen material may be of the knitted type or of a woven construction and the size of the openings depends upon the particular application involved. Normally in textile mills the openings will be in the vicinity of 1/8".

The endless belt 10 is mounted upon suitable sprockets or rollers 11 and 12. It will be noted that the upper roller 11 is located substantially above the tank whereas the lower roller 12 is substantially submerged within the vessel and adjacent the bottom 5. These rollers are mounted on shafts 13 and 14. These shafts are suitably journalled by means mounted upon the tank (not shown).

In order to rotate the endless belt, the upper shaft 13 is provided with a suitable pulley 15. This pulley is connected to another pulley 16 by means of a V-belt 17. The pulley 16 is connected to a suitable motor 20. It will be appreciated that other drive means may be employed. For example a sprocket chain drive may be employed and also suitable gear reduction means may be required between the motor and pulley 16 in order to determine a reasonable speed at which to rotate the endless belt 10.

The filter element 6 divides the vessel 2 into an inlet section 18 and a discharge section 19. In order to introduce liquid to be filtered into the vessel, an inlet line 22 is provided. In order to remove liquid from the vessel after it has been filtered a suitable discharge line 23 is provided. To separate the inlet side and the discharge side of the vessel, a suitable seal is provided between the bottom of the vessel 5 and the filter element 6. In view of the rotational nature of the filter element 6, a suitable rubbing type seal is provided which comprises an angle member 25 attached to the lower portion of the vessel having connected thereto a suitable backup plate member 26 for supporting a suitable rubber member 27 which is directed into contact with the belt 10 of the filter. In operation as the belt rotates, the rubber element 27 will be maintained in rubbing contact with the surface of the belt, thereby preventing any material in the inlet side 18 bypassing the filter element 6 into the discharge side 19.

The motor 20 is provided with energy by means of suitable power lines 31 and 32. The operation of the filter system is such that it is not desirable to continually have the filter element in motion. Accordingly, the power introduced to the motor passes through the line 32, through a suitable switch 33, which is actuated by an arm 35, having at the end thereof a suitable float 34. By this means switch 33 is closed at a predetermined level 60 of liquid within the inlet side of the vessel 2. When the liquid has reached a predetermined level, current is permitted to pass through the line 36 up to the timing mechanism 37. This timing mechanism may be of any kind commercially available, the purpose of the element is merely to actuate the motor 20 for a given amount of time so that a section of the belt 10 will be rotated for a purpose to be more fully described hereinafter. The time mechanism 37 is connected by means of a line 38 to the motor 20 and the motor 20 is connected to the power line 31, thereby completing an electrical circuit.

In order to prevent the incoming liquid in the line 22 from having too violent an effect on the float 34, a baffle plate 7 is placed in the vessel to isolate the agitating action of the liquid as it enters the vessel.

In order to maintain the cleanliness of the filter elements 6, a header 40 is horizontally disposed beneath the roller element 11 which supports the endless belt 10. This header has located at suitable intervals T members 41 which have mounted therein suitable nozzle members 42. In order to supply liquid to the header 40, liquid is taken from the discharge 23, passed through line 43 and pumped by means of a pump 44 through the line 45 to the header 40. The liquid as it passes through the header 40 passes up through the T elements 41 through the nozzles 42, thereby providing a plurality of parallel spaced streams of water directed in a vertical direction.

In order to thoroughly clean the endless belt 10, it is desirable to have a sheet of water passing through the screen rather than a plurality of spaced streams. For this purpose, a suitable arcuate baffle plate 46 is mounted above the nozzle members 42 for the purpose of turning the streams of water issuing from the nozzles 42 and also spreading out the individual streams of liquid so as to make them overlap, causing a single continuous sheet of water to pass in a direction normal to the endless belt 10. This stream will pass through the belt by passing through the previously mentioned perforations in the belt and removing the lint particles located therein.

In order to prevent the lint removed from the belt 10 from passing back into the water in the inlet side of the vessel, a suitable collecting means is provided. This collecting means comprises a hood 50, which may have perforations of a size to maintain the lint particles within the hood while permitting the circulated water to pass through the perforations. This hood 50 is mounted upon a settling tank 51. The settling tank extends substantially across the tank as does the hood 50 and comprises a straight section 52 and a converging portion 53 located below the straight portion. If desired perforations may be made in the upper portion of the straight section to drain off water into the vessel 2. Connected to the bottom of the converging portion 53 of the settling tank is a suitable drain elbow 54 which is connected by a line 55 to the exterior of the vessel 2. In the line 55 outside of the vessel, there is located a suitable valve 56, the purpose of which will be more fully described hereinafter.

Considering the operation of the present invention, water to be filtered is collected from the various air treatment devices and passed through the line 22 into the vessel 2. This water enters into the inlet side of the vessel 18 and a sufficient quantity is passed therein as to create sufficient head as to pass through the mesh of the endless belt 10 which comprises the filter element 6. As the liquid passes through the first side of the belt 10, the lint particles and other foreign matter are picked up by the small perforations in the belt, while the water passes into the discharge side 19. During operation the water level in the side 18 will be higher than in the discharge side 19, the water level in the inlet being shown at 60 and the water level on the discharge side being shown at 62. Between the surfaces of the belt 10, the water level will be at an intermediate level 61 because of the screen's resistance to liquid flow.

As the water continues to be introduced into the vessel 2 the level 60 will tend to increase, since the resistance of the belt member 10 to passage of water therethrough is increased by the clogging of the perforations in the belt. The level of liquid in the section 18 will continually rise as reflected by the continuing clogging of the openings within the screen which comprises the belt 10. When the level 60 has reached a predetermined height, as determined by the float mechanism comprising the switch 33, the arm 35 and the float 34, the switch will be closed, permitting electric current to pass through the line 32, through the switch 33, up through the line 36 through the timer mechanism 37 through the line 38, through the motor 20 and through the line 31, thereby completing a circuit. This energizes the motor 20, rotating the pulley 16, thereby transmitting rotational force through the V-belt 17 to the pulley 15, causing the belt 10 to rotate. As the belt rotates the lint and other foreign matter is removed from the belt. After a predetermined time, the timer mechanism 37 will open the previously described circuit, causing the motor 20 to be stopped.

Considering the cleaning of the belt 10, a plurality of nozzles 42 are spaced longitudinally along the belt 10 beneath the roller 11. These nozzle members 42 are mounted within suitable T connections 41 which are a part of header 40. This header 40 is connected to a source of circulating water which is taken from the discharge line 23 through the line 43 and is pumped by means of the pump 44 through the line 45 which is connected to the header 40. By this means a plurality of parallel streams of water issue from the nozzles 42 and these streams of water are directed in an upward vertical direction. In order to clean the screen, an arcuate baffle 46 is provided to turn the individual streams of water issuing from the various nozzles and also to flatten out these streams so that the adjoining nozzles have streams which overlap and connect, thereby providing a single sheet of discharge water which passes normal to the surface of the belt 10.

This single flat stream of water passes through the various perforations within the belt 10, dislodging the lint thereon and directing this lint into the opening of the hood 50. The perforations in the hood 50 are too small for the lint to pass therethrough; however, the water is permitted to pass therethrough and return into the vessel 2.

The hood 50 being mounted upon the settling tank 51 directs all the lint removed from the belt 10 into this vessel and, since the lint and water is substantially aerated, the lint will tend to float for a length of time until the air is passed from the lint. Since the lint is of a slightly higher density than the water, the lint will tend to settle within the tank, passing from the straight section 52 down into the converging section 53 and into the line 55. Simultaneously the water in the vessel will tend to remain on the top and, if desired, suitable discharge openings or perforations are provided for the liquid to pass through the settling tank or through the perforated screen 50 into the inlet side 18 of the vessel 2. Depending upon the operation of the textile mill and the particular volume of water handled, at certain time intervals the valve 56 in the line 55 is opened permitting the settled lint within the vessel 51 to be drained therefrom.

If desired, the pump 44 which circulates water through the header 40 which provides water to the various nozzles 42 may be operated continuously as shown herein or the operation of this pump may be tied to the operation of the motor 20 thereby tying the cleaning operation and the lint removing operation into a single control system. However, this is not necessary since the amount of water circulated by the pump 44 is comparatively small and this water which is circulated is not wasted, since it is passed back into the vessel 2.

The present invention provides a centralized filter system which has adequate storage for water on shutdown and also provides a filter of greater effectiveness as a result of the finer mesh screen which may be utilized herein. This is a result of the higher head differentials within the vessel utilized in addition to the improved method of removing lint from the screen and, further, including the improved method of collecting this lint so removed, since the lint removed is now handled within pipes as differentiated from the prior method of collecting the lint in screens which had to be manually carried through the mill.

While I have described a preferred embodiment of my invention it will be understood the invention is not limited thereto, since it may be otherwise embodied within the scope of the following claim.

I claim:

In a filter system, the combination of a vessel, a movable filter located in said vessel adapted to be partially submerged in liquid, said filter extending substantially across said vessel to divide the vessel into a first section and a second section, means for introducing liquid into the first section, means for removing liquid from the second section, means for removing lint from the filter in response to the increased level of liquid in the first section as a result of the accumulation of lint in the filter, means for collecting the lint from the filter, said means for removing the lint including a plurality of spaced nozzles located above the liquid level of the first section and adapted to discharge a plurality of liquid streams in a substantially vertical direction, and an arcuate baffle plate spaced above the nozzle members in the path of the vertically discharged liquid streams serving to turn the vertically discharged streams in a substantially horizontal direction and to overlap the individual streams to convert the individual streams into a continuous sheet of liquid impinging on the filter element to discharge lint therefrom, said means for collecting lint comprising a settling tank in said vessel extending substantially across the vessel, said tank including a substantially vertical first section and a converging second section below the first section connected to discharge means to discharge settled lint, the first section having perforations therein to drain liquid in the vessel and a hood mounted on the tank and connected to the first section thereof extending substantially across the vessel and having a longitudinal opening adjacent the filter to receive liquid and lint discharged from the filter, said hood having perforations therein of a size to maintain lint within the hood while permitting liquid to pass through the perforations.

References Cited in the file of this patent

UNITED STATES PATENTS

| | | |
|---|---|---|
| 658,196 | Whitney | Sept. 18, 1900 |
| 782,680 | Millspaugh | Feb. 14, 1905 |
| 963,354 | Braemer | July 5, 1910 |
| 973,697 | Potts | Oct. 25, 1910 |
| 1,194,250 | Smits | Aug. 8, 1916 |
| 1,411,945 | Wallene | Apr. 4, 1922 |
| 1,716,376 | Geiger | June 11, 1929 |
| 2,525,516 | Bergmann et al. | Oct. 10, 1950 |
| 2,665,812 | Crane | Jan. 12, 1954 |
| 2,804,209 | Carlton et al. | Aug. 27, 1957 |

FOREIGN PATENTS

| | | |
|---|---|---|
| 602,884 | France | Jan. 4, 1926 |